US008984395B2

(12) United States Patent
Hedbor et al.

(10) Patent No.: US 8,984,395 B2
(45) Date of Patent: Mar. 17, 2015

(54) METHODS, SYSTEMS AND DEVICES FOR TRANSCODING AND DISPLAYING ELECTRONIC DOCUMENTS

(75) Inventors: Per Hedbor, Linkoping (SE); Johan Schon, Linkoping (SE)

(73) Assignee: Opera Software ASA, Oslo (NO)

( * ) Notice: Subject to any disclaimer, the term of this patent is extended or adjusted under 35 U.S.C. 154(b) by 530 days.

(21) Appl. No.: 12/487,286

(22) Filed: Jun. 18, 2009

(65) Prior Publication Data
US 2010/0023855 A1 Jan. 28, 2010

Related U.S. Application Data

(60) Provisional application No. 61/073,972, filed on Jun. 19, 2008.

(51) Int. Cl.
*G06F 3/00* (2006.01)
*G06F 17/30* (2006.01)

(52) U.S. Cl.
CPC ................ *G06F 17/30905* (2013.01)
USPC ......................................................... 715/234

(58) Field of Classification Search
CPC .............. G06F 3/0481; G06F 17/5036; G06F 17/5081; G06F 17/30905
USPC .................. 715/234, 235, 236, 255
See application file for complete search history.

(56) References Cited

U.S. PATENT DOCUMENTS

| 7,348,982 | B2 * | 3/2008 | Schorr et al. ................... 345/441 |
| 2002/0015042 | A1 | 2/2002 | Robotham et al. |
| 2002/0129006 | A1 * | 9/2002 | Emmett et al. .................... 707/1 |
| 2004/0098342 | A1 * | 5/2004 | Onishi et al. .................... 705/51 |
| 2004/0255244 | A1 | 12/2004 | Filner et al. |
| 2005/0041858 | A1 | 2/2005 | Celi, Jr. et al. |
| 2005/0229111 | A1 * | 10/2005 | Makela ......................... 715/802 |
| 2007/0061415 | A1 * | 3/2007 | Emmett et al. ................ 709/217 |
| 2007/0300162 | A1 * | 12/2007 | Goto ............................ 715/745 |

(Continued)

FOREIGN PATENT DOCUMENTS

| CN | 1613105 A | 5/2005 |
| CN | 1801149 A | 7/2006 |

(Continued)

OTHER PUBLICATIONS

Cai et al., "VIPS: a Vision-based Page Segmentation Algorithm," Nov. 1, 2003, pp. 1-29.*

*Primary Examiner* — Kyle Stork
(74) *Attorney, Agent, or Firm* — Birch, Stewart, Kolasch & Birch, LLP

(57) ABSTRACT

A received markup language document including a structured list of elements is transcoded by a method which includes analyzing the structure of the document, generating a virtual rendering of a layout of the document, and identifying one or more rectangles each containing at least one element from the virtual rendering. Data representative of the markup language document is generated, including a list of rectangles and their positions in the layout. The thus transcoded document can be displayed on a device which receives the generated data. When a position or a direction within the document is selected, such device may analyze the layout of the document to select at least one of the rectangles based on the position or direction. The device may then display at least a portion of the document selected such that the identified rectangle is given a predefined position on the display.

27 Claims, 8 Drawing Sheets

(56) References Cited

U.S. PATENT DOCUMENTS

| | | | |
|---|---|---|---|
| 2008/0059478 A1* | 3/2008 | Craine | 707/10 |
| 2008/0109327 A1* | 5/2008 | Mayle et al. | 705/27 |
| 2008/0136822 A1* | 6/2008 | Schorr et al. | 345/441 |
| 2008/0155389 A1* | 6/2008 | Suh | 715/207 |
| 2008/0222273 A1 | 9/2008 | Lakshmanan et al. | |
| 2009/0298529 A1* | 12/2009 | Mahajan | 455/550.1 |

FOREIGN PATENT DOCUMENTS

| | | |
|---|---|---|
| CN | 1853157 A | 10/2006 |
| EP | 1 672 524 A2 | 6/2006 |
| WO | WO 2004/023450 A1 | 3/2004 |
| WO | WO 2005/029308 A2 | 3/2005 |
| WO | WO-2008/035986 A1 | 3/2008 |

* cited by examiner

METHODS, SYSTEMS AND DEVICES FOR TRANSCODING AND DISPLAYING ELECTRONIC DOCUMENTS

TECHNICAL FIELD

The present invention relates to transcoding of electronic documents in order to facilitate displaying of such documents on the display of a device. In particular, the invention relates to a method for identifying element blocks in a document and including a list of the identified blocks and their positions in the transcoded version of the document.

BACKGROUND ART

Electronic documents such as web pages are often designed to be displayed on regular desktop computers with standard size displays. When such documents are displayed on other devices, e.g., handheld devices, mobile phones, television sets or gaming consoles, the size and layout of the display may not render the document in a manner that is convenient to the user. On a small display with relatively low resolution, a document may be displayed such that only a small portion of the document can be shown inside the viewport of the device. In order to view the portions of the document that falls outside the display, the user must scroll horizontally and vertically. These scrolling operations are often inconvenient to the user, particularly since the user input interface on such devices are not designed for accurate scrolling of documents.

One typical solution to this problem has been to resize or move parts of the document, such as reducing image sizes, reducing the number of columns by changing the layout of the document, and changing colors, contrasts, brightness and font sizes. Such approaches have the drawback that the document is not displayed as the document author intended, and information that is inherent in the layout of the document may be lost.

SUMMARY OF THE INVENTION

According to the present invention a method is provided for including in a document, before it is displayed on a device, a list of identified elements and their positions in the document. According to one aspect of the invention, a transcoding server may receive the original document, perform a method that is consistent with the principles of the invention, and forwards the transcoded document to a requesting device to be displayed.

According to a second aspect of the invention, a device may be configured to perform a method of displaying a transcoded document and to select and display portions of the document in accordance with the listed positions of the elements.

The details of the invention are defined in the appended claims, while exemplary embodiments are set forth below with reference to the drawings.

DETAILED DESCRIPTION OF EXEMPLARY EMBODIMENTS OF THE INVENTION

The present invention will now be described in further detail with reference to the accompanying Figures. The present invention may be embodied in many different forms and should not be construed as limited to the embodiments set forth herein. Rather these embodiments are provided as examples in order to provide those skilled in the art with a complete understanding of the invention.

In particular it should be understood that while the examples refer to particular standards and formats for creating, formatting, transmitting and displaying content on the Internet and the World Wide Web, the invention should not be construed as limited to the particular standards mentioned herein.

Figure 1:
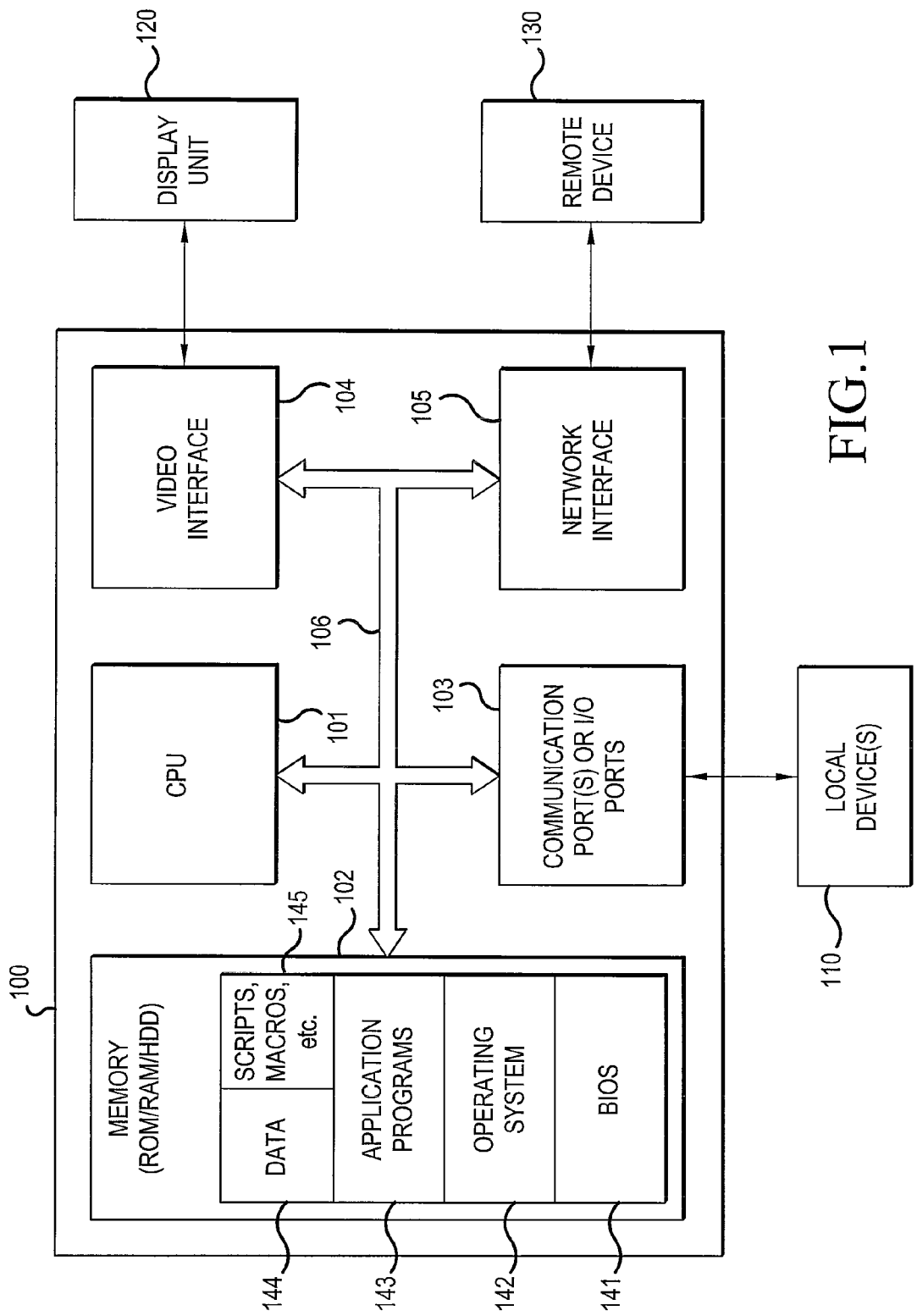
FIG. 1 illustrates the basic components of a computing device.

FIG. 1 illustrates a generalized computing device 100 that can be used as an environment for implementing various aspects of the present invention. The various elements illustrated in the drawing may be implemented on a server performing the transcoding of a document as well as on a device displaying a transcoded document, but it will be realized by those with skill in the art that the various components will vary in size, performance and capabilities on so different types of devices.

In FIG. 1, a device 100 includes a central processing unit (CPU) 101, memory 102, communication port(s) or input/output ports (I/O ports) 103, a video interface 104, and a network interface 105. These units are in communication with each other by way of a system bus 106.

The memory, which may include ROM, RAM, flash memory, hard drives, or any other combination of fixed and removable memory, stores the various software components of the system, such as a basic input/output system (BIOS) 141, an operating system 142, various computer programs 143 including applications and device drivers, various types of data 144, and other executable files or instructions such as macros and scripts 145.

The I/O ports 103 may be connected to one or more local devices 110 such as user input devices such as keyboard, mouse, or a remote control, a printer, media players, external memory devices, and special purpose devices such as, e.g., a global positioning system receiver (GPS) or a television set top box. The I/O ports 103 may be any combination of such ports as USB, PS/2, RS-232, infra red (IR), Bluetooth, printer ports, or any other standardized or dedicated communication interface for local devices.

The video interface device 104 is connected to a display unit 120 which may be an external monitor or an integrated display such as an LCD display. The display unit 120 may have a touch sensitive screen and, in that case, the display unit 120 may double as a user input device. The user input device aspects of such a display unit 120 may be considered as one of the local devices 110 communicating over a communication port 103.

The network interface device 105 provides the device 100 with the ability to connect to a network in order to communicate with a remote device 130. The communication network, which in FIG. 1 is only illustrated as the line connecting the network interface 105 with the remote device 130, may, e.g., be a local area network or the Internet. The remote device 130 may in principle be any computing device with similar communications capabilities as the device 100, but may typically be a server or some other unit providing a networked service. It will be understood by those of ordinary skill in the art that the communication network may be any publicly accessible network, or combination of networks, including the Internet, cellular mobile networks such as GSM, the public telephone network, cable networks, or analog or digital broadcasting or satellite.

It will be understood that the device 100 illustrated in FIG. 1 is not limited to any particular configuration or embodiment regarding size or resources. The various functional components illustrated may be implemented as an integrated unit of the device 100 or distributed over several units. Other units or capabilities may of course also be present. Furthermore, the device 100 may, e.g., be a server, a general purpose computer such as a PC, or a personal digital assistant (PDA), a cellphone or a smartphone, or a gaming console or television set top box or media center.

Figure 2:
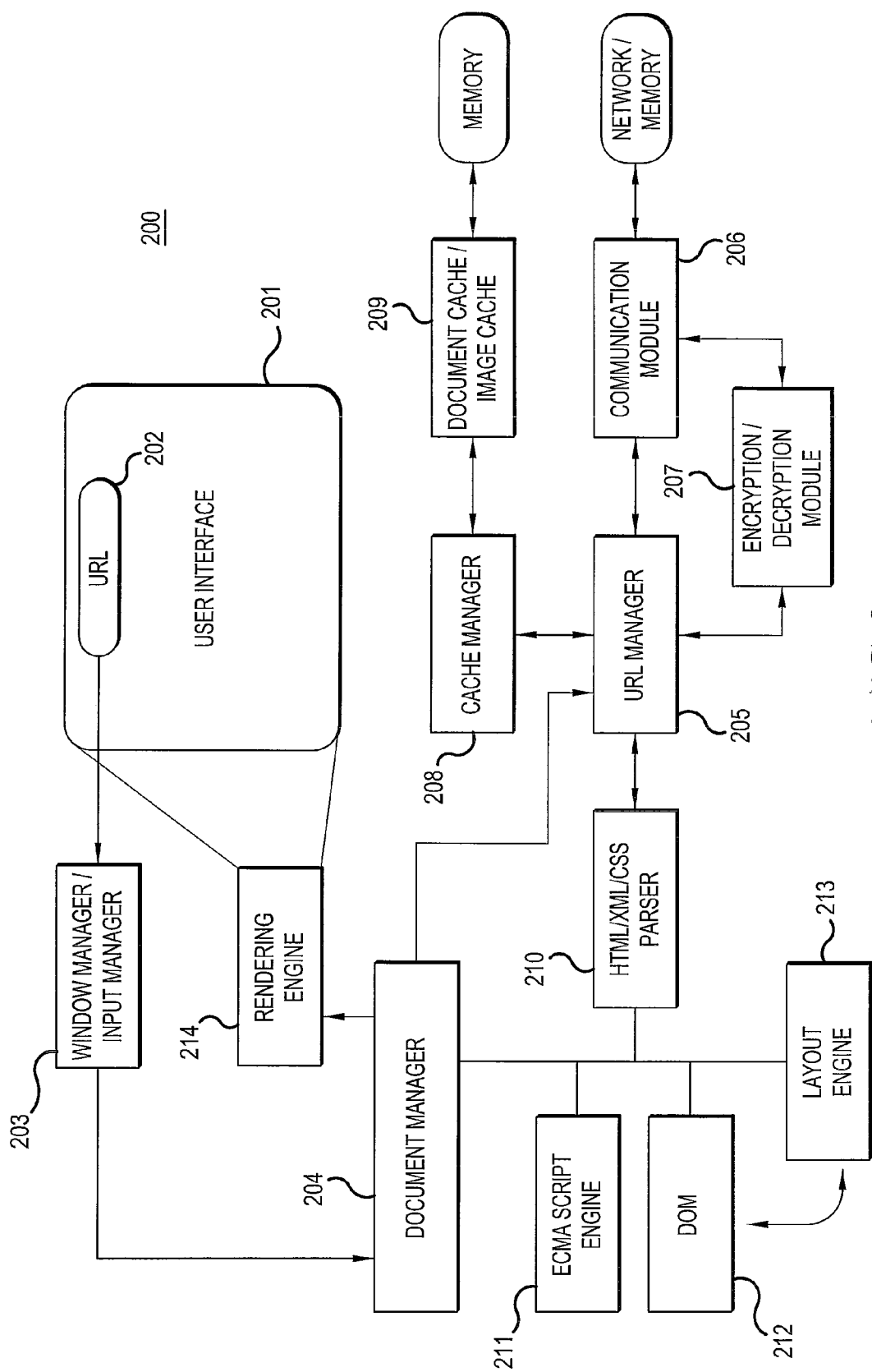
FIG. 2 illustrates the basic architecture of a user agent such as a web browser.

Various aspects of the present invention may be implemented as components and/or functionality that make up parts of a user agent or a browser that may be installed as an application on a device 100. FIG. 2 shows an example of a number of modules that may be present in such a user agent. The modules will typically be software modules, or otherwise implemented in software, that may be executed by the CPU 101.

The user agent 200 presents the user with a user interface 201 that may be displayed on the display unit 120 shown in FIG. 1. The user interface 201 may include an address field 202 where the user may use an input device to enter the uniform resource identifier (URI) of a document or a service he or she wants the user agent 200 to retrieve. The address field 202 may also be a link that is displayed and that may be activated by the user using a pointing device such as a mouse, a scrolling device or some other means for selecting displayed items. Alternatively the URI may be specified in the code of a document or script already loaded by the user agent 200.

In any case, the URI may be received by a window and input manager 203 that represents the input part of a user interface 201 associated with or part of the user agent 200. The URI may then be forwarded to a document manager 204 which manages the data received as part of the document identified by the URI.

The document manager 204 forwards the URI to a URI manager 205 which again instructs a communication module 206 to request access to the identified resource. The communication module 206 may be capable of accessing and retrieving data from a remote device 130 such as a server over a network using the hypertext transfer protocol (HTTP) or some other protocol such as HTTPS or FTP. The communication module 206 may also be capable of accessing data that is stored in local memory 102.

If communication outside the device 100 is required to be encrypted, e.g., as specified by the protocol used to access the URI, encryption/decryption module 207 handles communication between the uniform resource locator (URL) manager 205 and the communication module 206.

The data received by the communication module 206 in response to a request is forwarded to the URI manager 205. The URI manager 205 may then store a copy of the received content in local memory 102 using a cache manager 208 which administers document and image cache 209. If the same URI is requested at a later time, the URI manager 205 may request it from the cache manager 208 which, unless the cached copy has been deleted, will retrieve the data from the cache 209 and forward it to the URI manager 205. In this case it will not be necessary to retrieve the data again from a remote device 130 when the same URI is requested a second time.

The URI manager 205 forwards the received data to a parser 210 that may be capable of parsing such content as HTML, XML and CSS. The content may then, depending on the type and nature of the content, be processed further by an ECMAScript engine 211, a module for handling a document object model (DOM) structure 212 and/or a layout engine 213.

This processing of the retrieved content is administered by the document manager 204, which may also forward additional URI requests to the URI manager 205 as a result of the processing of the received content. These additional URIs may, e.g., specify images or other additional files that should be embedded in the document specified by the original URI.

When the data representing the content of the specified document has been processed, it is forwarded from the document manager 204 in order to be rendered by a rendering engine 214 and displayed on the user interface 201.

The various modules thus described are executed by the central processing unit 101 as the processor receives instructions and data over the system bus(es) 106. The communications module 206 communicates with the remote device 130 using the network interface 105. The functionality of the various modules may of course be integrated in fewer larger modules, or the functionality of any one of the thus described modules can be distributed or replicated over several modules.

It will further be understood that the user agent 200 just described may be implemented as an application program 143, but that some functionality may also be part of the operating system 142 or even the BIOS 141 of the device 100. The content received in response to a URI request may be data 144, script 145 or a combination of these as further described below.

Electronic documents, such as web pages, are typically created using a markup language such as HTML, XHTML or XML, and they are usually given a layout that is designed for standard computer displays. However, user agents such as browsers are more and more often installed on other types of devices, such as PDA's, cellphones, television set top boxes and gaming consoles. Such devices have a wide variety of displays with different sizes, shapes and resolution. These devices may not be able to render and display web pages in a meaningful way. A document may be reduced in size to the point of becoming unreadable, only a small part of the document may be displayed at a time, or the layout of the document may be changed in ways that were never intended by the creator of the document.

Figure 3A:
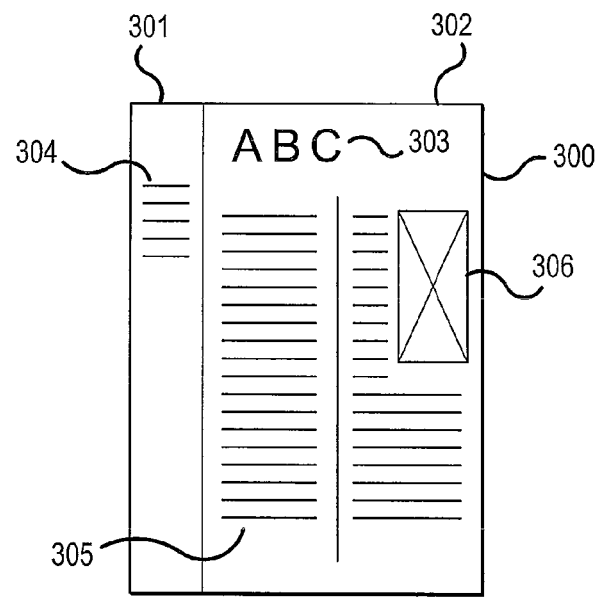
FIGS. 3A-3C show an exemplary web page.
Figure 3B:
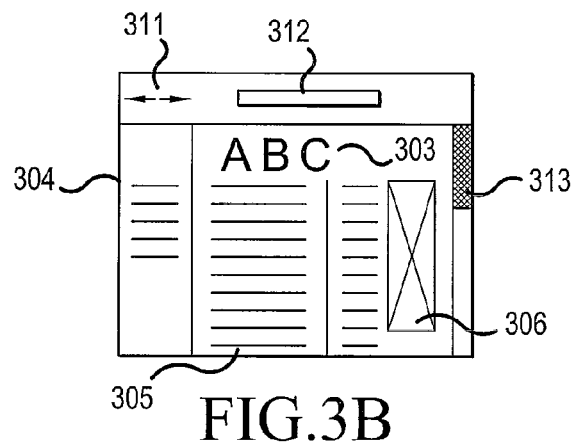
Figure 3C:
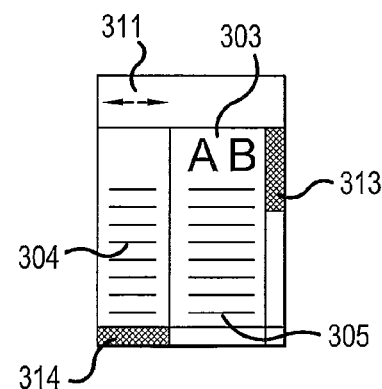

Reference is now made to FIGS. 3A-3C to describe an exemplary embodiment of the present invention. FIG. 3A shows the entire layout of an exemplary web page 300. The web page 300 includes a left margin 301 and a main content area 302. The main content area 302 includes an article starting with a headline 303, while the left margin 301 includes a navigation menu 304 with a number of menu entries that may be hyperlinks to other parts of the same web site. In the main content area 302, two columns of text follows below the headline 303, and within the right column an image 306 has been inserted.

FIG. 3B shows a part of the web page 300 of FIG. 3A displayed in a browser window or user agent window. The user agent employed may be similar to the user agent 200 which is described above with reference to FIG. 2, and the window may be displayed on the display 120 of a device 100 similar to that described above with reference to FIG. 1.

The window includes navigation buttons 311, an address field 312 where the URL of a desired document 300 may be entered, and a vertical scrollbar 313. The remaining part of the browser window is used to display a part of the document 300. This remaining part of the window is referred to as the viewport. It will be noticed that in the example illustrated in FIG. 3B, the viewport is wide enough to display the entire width of the web page 300, while only the upper part of the document 300 can be shown. In order to view the rest of the document 300, the vertical scrollbar 313 has been provided. This scrollbar 313 makes it possible to move the viewport down relative to the document 300.

FIG. 3C again shows a part of the web page 300, but this time displayed on a small display 120 that may be the display of a PDA or a cellphone. The user agent window may include some of the features of the browser window illustrated in FIG. 3B, such as navigation buttons 311 and a vertical scrollbar 313. In addition a horizontal scrollbar 314 has been provided. Because of the small size of the viewport, only a part of the document 300 can be displayed. In order to view the entire document 300, a user will have to scroll both horizontally and vertically.

In the case illustrated in FIG. 3B, it may be possible to read the entire document 300 without too much trouble. However, there may be reasons why a user may, for instance, want to zoom in on particular elements of the document 300, i.e., to enlarge the document 300 such that only a small section is displayed in the viewport. One example of such a reason could be that it is difficult to see the displayed content properly because the display 120 on which the user agent window is displayed has a low resolution, possibly in combination with the user being positioned a distance away from the display 120 (such as may be the case if the display 120 is the screen of a television). Another reason may be that the user has reduced eyesight and desires to enlarge the various parts of the document 300.

In the case illustrated in FIG. 3C, it will be realized that navigating through the document 300 may be difficult, and that reading the text 305 will be particularly difficult if the lines of text are wider than the viewport. A user may then desire to zoom in and out of the document 300, while bringing the desired content entirely inside the viewport, at least in one dimension.

Figure 4:
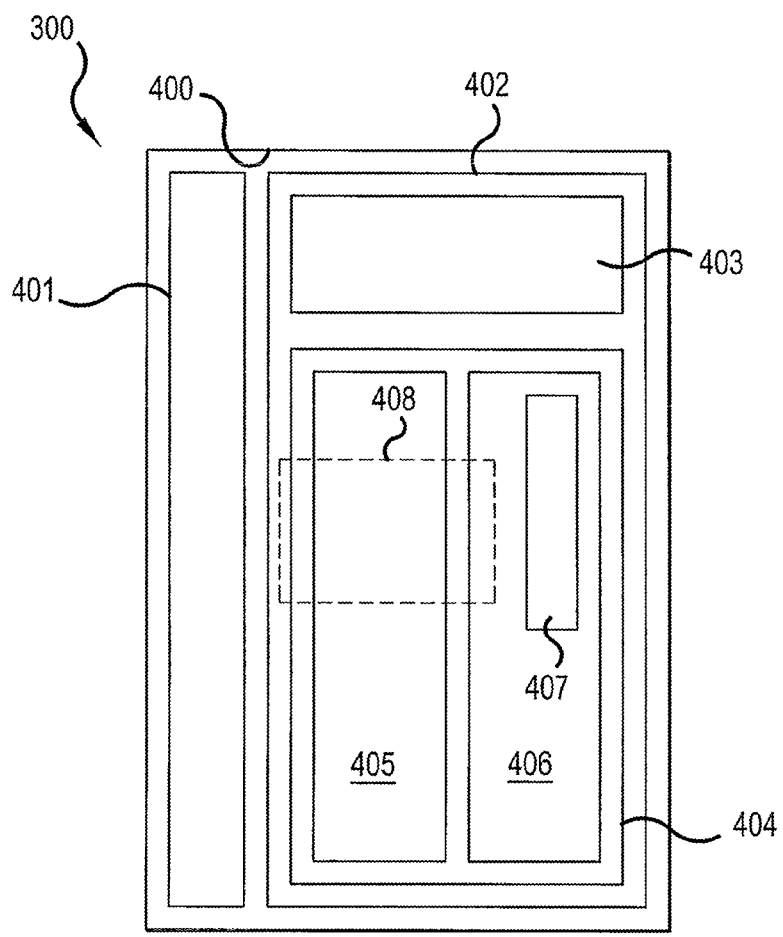
FIG. 4 illustrates how the layout of the web page of FIG. 3 may be organized.

Reference is now made to FIG. 4, which illustrates how the document 300 may be organized in terms of layout. It will be realized by those with skill in the art that this is only one of several examples, and that the same layout may be achieved in several ways, dependent upon, for example, the structure of the markup language code of the document 300.

The example illustrated in FIG. 4 is based on Cascading Styles Sheets (CSS), level 2 revision 1, as specified in Technical Report No. TR/2009/CR-CSS2-20090423 published by the World Wide Web Consortium (W3C) on Apr. 23, 2009, edited by Håkon Wium Lie, Ian Hickson, Tantek çelik and Bert Bos, the entire contents of which are hereby incorporated by reference. The invention is, however, not limited to this version of CSS, or CSS in general. The example given below is somewhat simplified and may not include all possibilities and features or exceptions.

When a markup language document is received by a user agent, such as the user agent 200 illustrated in FIG. 2, the document 300 is typically handled as described above. The layout engine 213 may, based on the DOM structure of the document 300, generate a number of boxes based on elements in the DOM tree.

The term "elements" is recognized by persons of ordinary skill in the art to refer to a syntactic constructs in a markup language document indicating structure. Such an element may define a structural unit containing content (e.g., text or image). The term "box" is recognized within the art to refer to a rectangular space within the layout of such document, to be occupied by the content of a particular element.

According to the general approach of the CSS 2.1 box model, boxes defined as block boxes establish containing blocks for descendant boxes. (Certain other types of blocks, such as inline boxes, are not block boxes.) In addition, certain other types of elements that are not defined as boxes, such as various table elements, also establish containing blocks.

The dimensions and position of a given box may be calculated with respect to the edges of its containing block. In FIG. 4, the top level box 400 is the containing block for the entire page 300. The left margin 301 is contained in one descendant box 401, while the main content 302 is contained in another descendant box 402. The position of the menu 304 may then be calculated based on the edges of its containing block 401. The headline 303 may be contained in a box 403 which has box 402 as its containing block. Box 402 may contain an additional box 404 which contains the main text 305 of the document 300. The position of the headline 303 may be calculated based on the edges of its containing block, box 403. Since the text 305 is distributed over two columns, the box 404 may contain two descendant boxes 405 and 406. Both of these boxes have box 404 as their containing block. Finally, box 406 contains an additional box 407, which has box 406 as its containing block, and which in turn serves as containing block for the image 306.

Additional boxes that are not shown in FIG. 4 may also be present. Typically, each line of text contained in boxes 405 and 406 has its own line box, and if the text contains hyperlinks, these links may be contained in inline boxes. A more detailed discussion of various types of boxes can be found in the above referenced CSS specification.

Finally, block 408 represents the position of a viewport of a device 100 displaying a portion of the document 300.

It has been proposed in U.S. patent application Ser. No. 11/525,177, published as U.S. Patent Application Publication No. 2008-0077880 on Mar. 27, 2008, which is assigned to the same assignee, that an analysis of this document structure can be utilized to select and display an area of interest of a document. The entire contents of U.S. patent application Ser. No. 11/525,177 and U.S. Patent Application Publication No. 2008-0077880 are hereby incorporated by reference in their entirety.

The inventors of the present invention have realized that small devices 100 may lack the computing power to efficiently analyze an entire document 300, and that many such devices 100 have limited bandwidth available to them when requesting and receiving documents 300, such that it may often be desirable to receive compressed versions of the documents 300, or data representing only portions of the documents 300. This may make a local analysis of the structure of the document layout even more difficult. According to one aspect of the present invention, analysis may be performed by a transcoding server, and data representing the results of the analysis may be included as part of the transcoded document.

Figure 5:
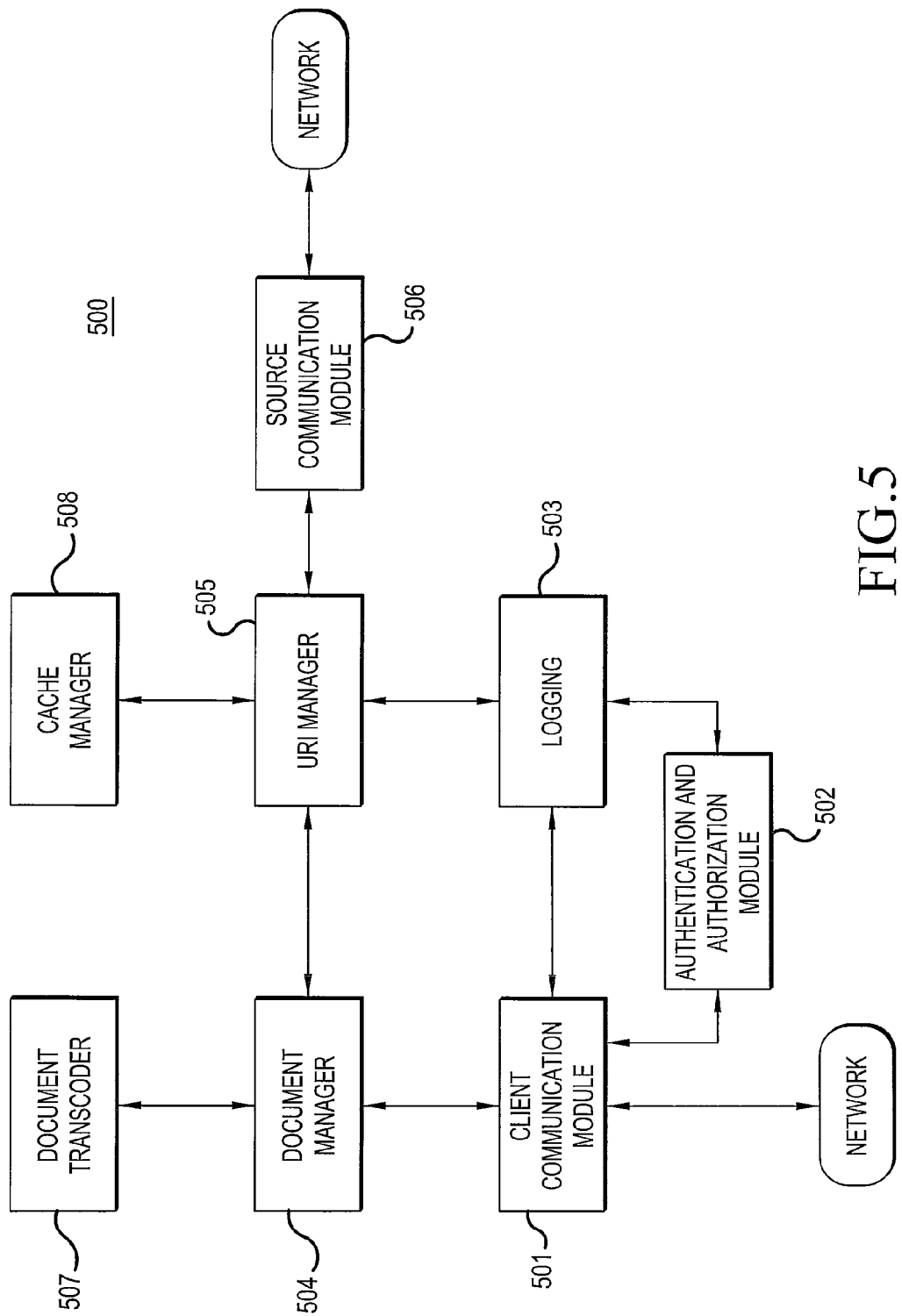
FIG. 5 is a block diagram illustrating a transcoding server.

Reference is now made to FIG. 5 which illustrates how a transcoding server 500 consistent with the principles of the invention may be organized in terms of software modules installed on a computer. Such a transcoding server 500 may be configured to operate as a proxy server which receives document requests from devices 100, fetches the documents 300, transforms the fetched documents 300 in accordance with the principles of the invention, and forwards the transformed documents to the requesting devices 100.

Among the modules of FIG. 5 is a client communication module 501 that may be configured to receive requests from devices 100. The client communication module 501 may receive HTTP(S) requests over TCP/IP, but consistent with the principles of the invention, the communication device 501 may also communicate using other standards or protocols and other types of networks than the Internet. By way of example, the client communication module 501 may be configured to communicate, directly or indirectly, over a mobile telephone network such as GSM, UMTS, CDMA or over wireless networks such as Wi-Fi Wireless LAN (IEEE 802.11) or WiMAX (IEEE 802.16).

The client communication module 501 may be connected to an authentication and authorization module 502, which determines whether a requesting client needs to be authenticated and determines whether the client is authorized to access requested resources over the server 500. Authentication and authorization can be handled by methods that are well known by those skilled in the art. One example of such methods is username/password combinations.

Received requests and the results of authentication may be logged in a logging module 503.

Whether a request is in the form of an HTTP or HTTPS request, or in any other format when it is received by the client communication module 501, it will in one way or another reference a resource such as a document or web page 300, and this identification will typically be in the form of a URI, or it may be transformed to a URI by the client communication module 501.

A document manager 504 may correspond to the document manager 204 illustrated in and described with reference to FIG. 2. In order to simplify the description, it may be assumed that the document manager 504 also incorporates functionality from additional modules shown in FIG. 2, such as the HTML/XML/CSS parser 210, the ECMAScript Engine 211, the DOM module 212 and the Layout Engine 213.

The URI received by the communication module 501 as part of a request. The URI may then be forwarded to a document manager 504 which manages the data received as part of the document 300 identified by the URI, much in the same way as a URI is forwarded from the window and input manager 203 as discussed above with reference to FIG. 2.

The document manager 504 may forward the URI to a URI manager 505 which again instructs a source communication module 506 to request access to the identified resource. The source communication module 506 may be capable of accessing and retrieving data from a remote device 130 such as a server over a network using the hypertext transfer protocol (HTTP) or some other protocol such as HTTPS or FTP. The source communication module 506 may also be capable of accessing data that is stored in local memory 102. If the communication standards and protocols used by the client communication module 501 and the source communication module 506 are the same, these two modules may be implemented as a single communication module handling all communications to and from the transcoding server 500.

In response to the request sent by the source communication module 506, data may be received in the form of one or more files. The received data may then be forwarded to the URI manager 505. The URI manager 505 may then store a copy of the received content in local memory a cache manager 208. If the same URI is requested at a later time, maybe even from a different device 100, the URI manager 505 may request it from the cache manager 508. This corresponds to the caching performed by a local user agent installed on a device 100, as described above with reference to FIG. 2, and also to methods performed by proxy servers, as will be readily apparent to those of ordinary skill in the art.

The URI manager 505 may then forward the received data to the document manager 504. The document manager 504 may then process the data in a manner similar to that which is described with reference to FIG. 2, except that in this case the document 300 is not necessarily rendered to a display. Instead, the document (or documents) 300 may be rendered to a virtual memory. Consistent with the principles of the invention, the document 300 may be rendered to a set of drawing commands in which, e.g., each command draws one line on a display 120 when forwarded to a display manager or controller. According to some embodiments of the invention, these commands may be in a binary format in order to reduce the amount of data necessary to describe the rendering of a document 300.

According to one exemplary embodiment of the invention, the document 300 is first described by a set of drawing commands which draws all images as gray rectangles, or as some other pattern that does not require transmission of a lot of data. After this description of the document 300 has been transmitted to the device 100, additional drawing commands that describe the images may instruct a display controller to draw the images on top of the gray rectangles. In this manner, the majority of the web page 300 can be rendered on the display 120 of a device 100 before all the image data has been received. In an alternative embodiment, instead of the rectangles being rendered gray, such rectangles may be rendered a color that represents the average color of the respective image.

Furthermore, the document 300 may be analyzed by a document transcoder 507 in order to identify blocks or boxes of elements such as text, images and hyperlinks, and their positions in a layout of the document 300, as described with reference to FIG. 4. The analysis may result in a list of rectangles, or content blocks, representing predefined types of content. A content block's position may be identified, e.g., as coordinates representing two diagonally opposed corners of the rectangle that is the content block, relative to a reference point, e.g., the upper left corner of the entire document layout. The list of content blocks may, for each block, include information in addition to its position, e.g., the type of element the block contains (text, image, hyperlink, table cell, etc.). If the block contains a hyperlink, the URI, or some representation of or reference to the URI, may also be included.

According to some embodiments of the invention, various rules may be implemented in order to decide which content blocks should be included in the list. Such rules may be based on element type (e.g., text blocks, image blocks, tables and all blocks that are hyperlink blocks), position in the document's 300 DOM tree, size, etc.

The document 300, whether it is in its original form, transcoded to a sequence of drawing commands, or transcoded in any other way, may now be packaged together with the list of rectangles which represents metadata. The document data, including the metadata, may then be forwarded from the document manager 504 to the client communication module 501. In order to reduce the use of bandwidth, the client communication module 501 may be configured to transmit only a portion of the document data, and the portion selected may be based on input received from the requesting device 100, including information describing display size and/or resolution, and user input representing navigation (scrolling) through the various parts of the document.

Figure 6:
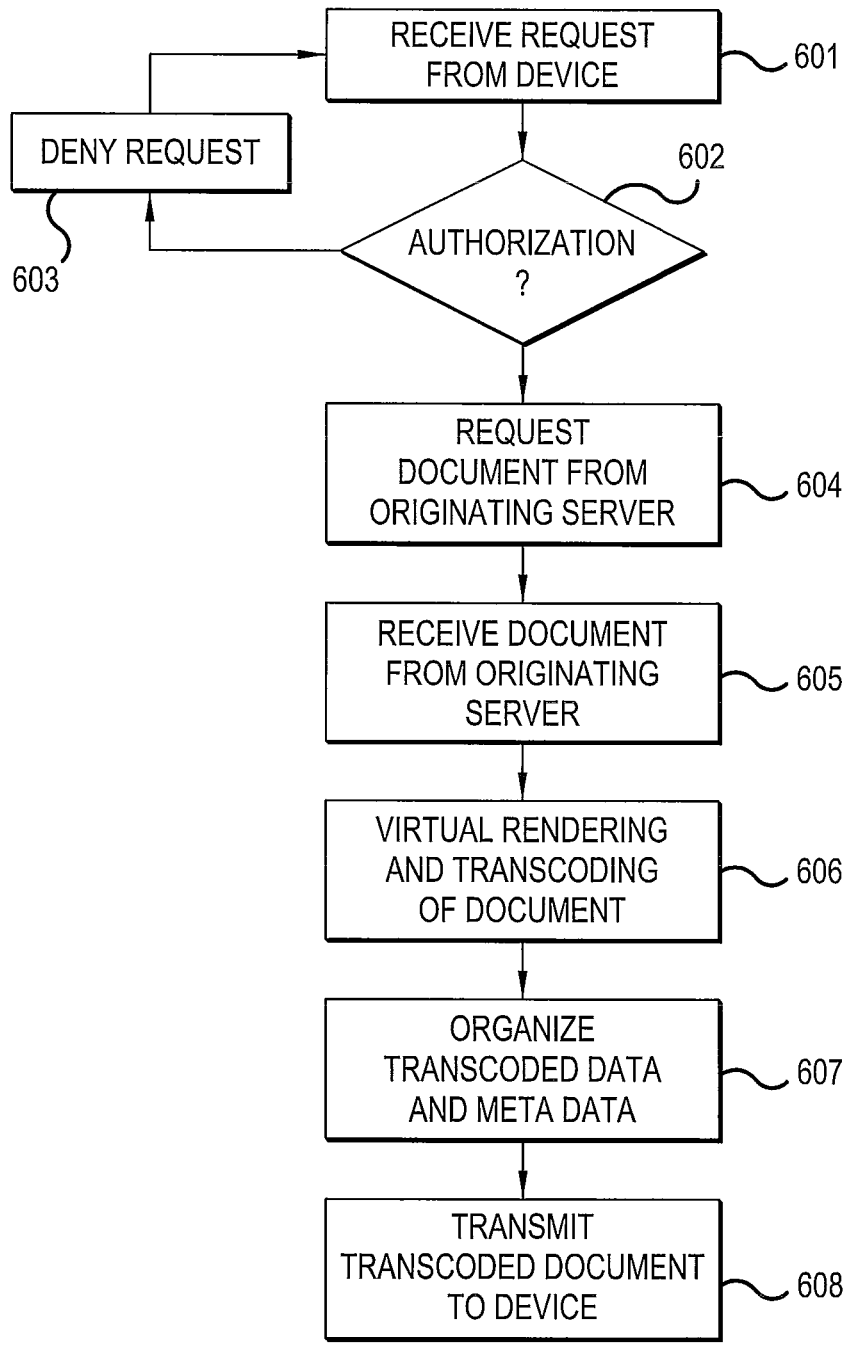
FIG. 6 is a flow chart showing an exemplary method of transcoding a document.

FIG. 6 illustrates in a flow chart how a transcoding server 500 may operate when it receives a request from a device 100.

In a first step 601, a request is received by the server from a device 100. The request identifies a resource such as, e.g., a web page 300. The resource may be identified by its URI.

In a next step 602, it is determined whether the requesting device 100 is authorized to communicate with the transcoding server 500. This process may involve additional communication with the device 100, e.g., in order to obtain a user name and password, or a digital certificate.

If authorization is not obtained, the request is denied by the transcoding server 500 in step 603 and the server 500 returns to wait for the next request from a device 100.

If authorization is verified by the authentication and authorization module 502 in step 602, the request is processed, and in a next step 604, the source communication module 506 is instructed to send a HTTP or HTTPS request to obtain the resource identified by the URI from the server where the resource is stored, also referred to as the originating server.

In step 605, the requested resource is received by the source communication module 506. The received resource may include references to additional elements that must be obtained through separate HTTP requests, in which case additional requests are sent by the source communication module 506.

In a next step 606, virtual rendering and transcoding is performed by the document manager 504 and the document transcoder 507, as described above.

In step 607 the transcoded document may be organized as a set of drawing commands, a list of rectangles describing the location of content on the page, a list of hyperlinks including their locations on the page and the URI they reference. As described above, early in the stream of drawing commands, images may be described as rectangles with a simple color or pattern, e.g., average color for each image, while the drawing commands describing actual images are transmitted last.

In step 608, the transcoded document is transmitted to the requesting device 100.

The device 100 receiving the transcoded data may include a user agent that is capable of receiving the data and render the document 300 on a display 120 of the device 100. As suggested above, a general browser type user agent 200 such as the one illustrated in FIG. 2 may be used, assuming such user agent 200 includes the necessary additional capabilities for handling documents 300 transcoded in accordance with the principles of the present invention. However, according to an alternative embodiment, the device 100 may include a user agent dedicated exclusively to handling data corresponding to the transcoding of the document 300 according to principles of the present invention.

Figure 7:
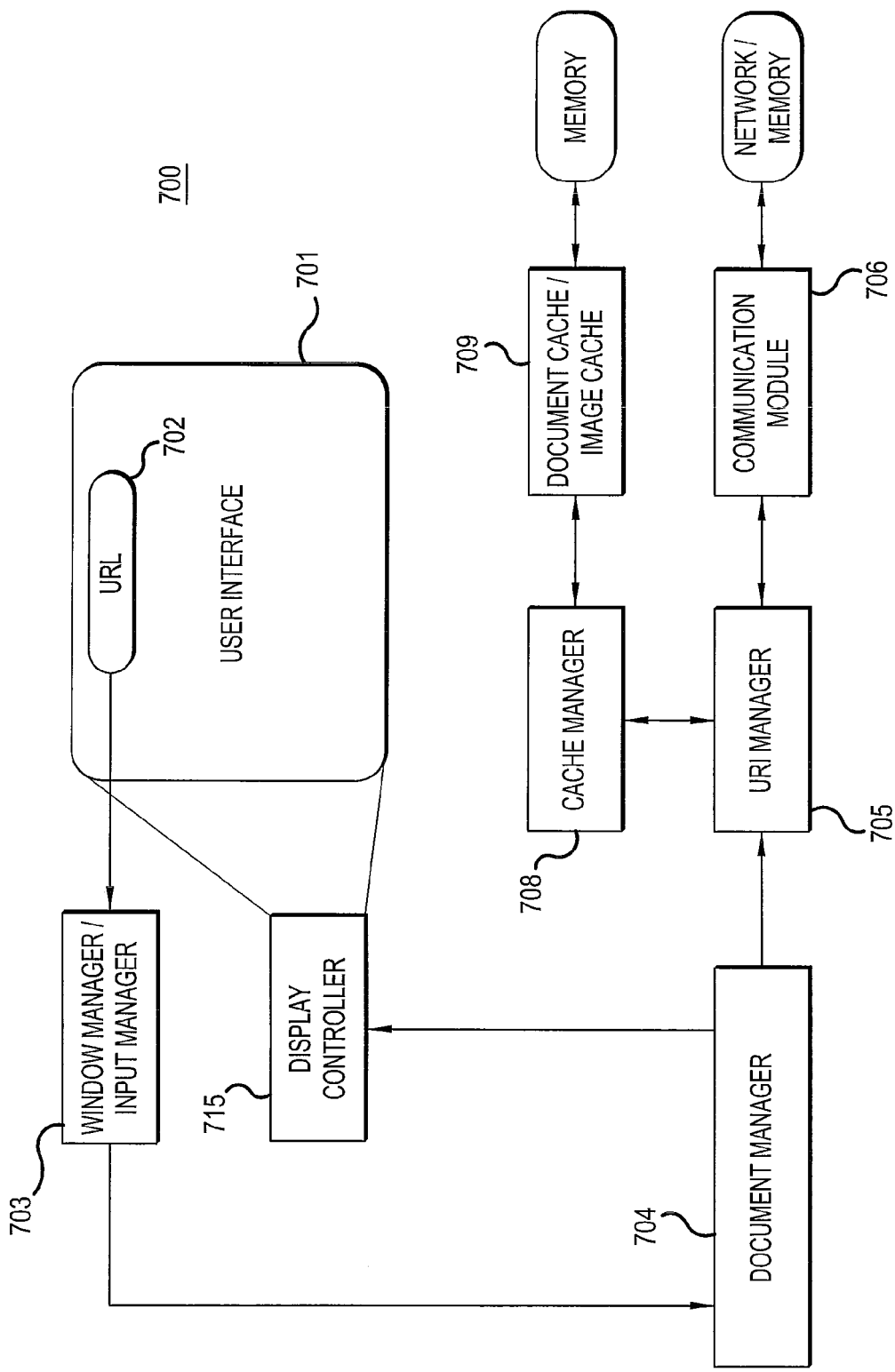
FIG. 7 is a block diagram illustrating a user agent configured to display documents coded or transcoded in accordance with the invention.

Thus, reference is made to FIG. 7, which illustrates a user agent 700 dedicated to handling transcoded documents. As such, the user agent 700 is illustrated as lacking the normal HTML/CSS handling capabilities, which have been implemented in the transcoding server 500.

The user agent 700 may include a user interface 701 and an address input field 702. A window manager/input manager 703 may receive user input from the address input field 702, or from any user input device such as a pointer or cursor. The input manager 703 will typically be able to register the position of a pointer in the document 300 (including position inside content rectangles and distance to content rectangles, as will be further described below), and interaction with hyperlinks or other input elements in the document 300.

A document manager 704 may differ from the corresponding document manager 204 described with reference to FIG. 2 in that general HTML/CSS capabilities (and associated modules such as HTML/XML/CSS parser, DOM module and layout engine) does not have to be present (but, as already mentioned, it is consistent with the principles of the invention to have this capability present in a user agent implementing the invention). The document manager 704 is configured to receive user input, and in the case where such input represents a request for a document 300 identified through its URI, forward such input to a URI manager 705. The URI manager 705 may forward the request to a communication module 706, and receive any received responses from the communication module 706 in a process corresponding to that which has been described with reference to FIG. 2. The user agent 700 may also implement caching using a cache manager 708 and document cache 709 stored in local memory.

The document manager 704 may further be configured to receive document content from the URI manager and send the received drawing commands to a display controller 715. The display controller 715 responds by drawing a relevant portion of the document 300 on the display 120 of the device 100, inside the user interface 701 of the user agent 700.

The document 300 will typically be larger than the viewport of the user interface 701. The document manager 704 may be configured to receive user input that requests display at several zoom levels in order to display the document 300 in a mode that gives the user an overview of a large part or the entire document 300, and in a mode that allows the user to read text and view images at a convenient resolution. One or more of the zoom levels may then, in accordance with the invention, support scrolling based on the information contained in the received data as content rectangles.

If the document manager 704 receives user input representing a request to scroll in a particular direction, the document manager 704 may instruct the display controller 715 to send draw commands to the screen such that the content is scrolled in the requested direction until the edge of a content rectangle is positioned along the edge of the viewport of the user interface 701.

Consistent with the principles of the invention, a user input representing a "click" inside a rectangle, but not associated with a hyperlink or any other type of special element such as in input box, may be interpreted as a request to scroll such that the identified rectangle is positioned in the upper left corner of the viewport of the user interface 701, or alternatively to scroll in one direction such that one edge of the rectangle is aligned with a corresponding edge of the viewport.

As mentioned above, the input manager 703 may be capable of tracking the position of a pointing device such as a mouse pointer. This position can be compared with the list of rectangles received as part of the description of a document. Consistent with some embodiments of the invention, rectangles may be overlapping or inside other rectangles, e.g., a rectangle representing an image may be positioned entirely inside a rectangle representing a text block representing an article the image is associated with. The pointer, or cursor, may thus be inside several boxes at the same time. This means that if a user input defining a position inside of several rectangles is received by the input manager 703, a rule must be established to determine which rectangle should be aligned with the viewport of the user interface 703. According to one exemplary embodiment of the invention, the innermost rectangle—a rectangle that does not itself contain any rectangles—is selected. As an example, assuming that the document 300 illustrated in FIG. 4 is displayed by the device 100, if user input defining a position inside box 405 it will by necessity also be inside box 404, box 402 and box 400. However, the box 405 is the innermost rectangle, and according to this embodiment of the invention, the viewport 408 and the document may move relative to each other such that column 405 and the corresponding text block 305 are aligned with the viewport 408. Similarly, if the pointer is inside box 407, it is not the right hand column of text 305, but rather the image 306 that is selected.

Alternative, or additional, rules for selecting a rectangle when a position is inside more than one rectangle are possible. One alternative is to give priority based on the type of element that is associated with the rectangle, such as text, images, tables, etc. Another alternative is to assign priorities in the transcoding server 500 based on rules implemented therein, and to select the rectangle with the highest priority in the user agent 700 on the device 100.

Figure 8:
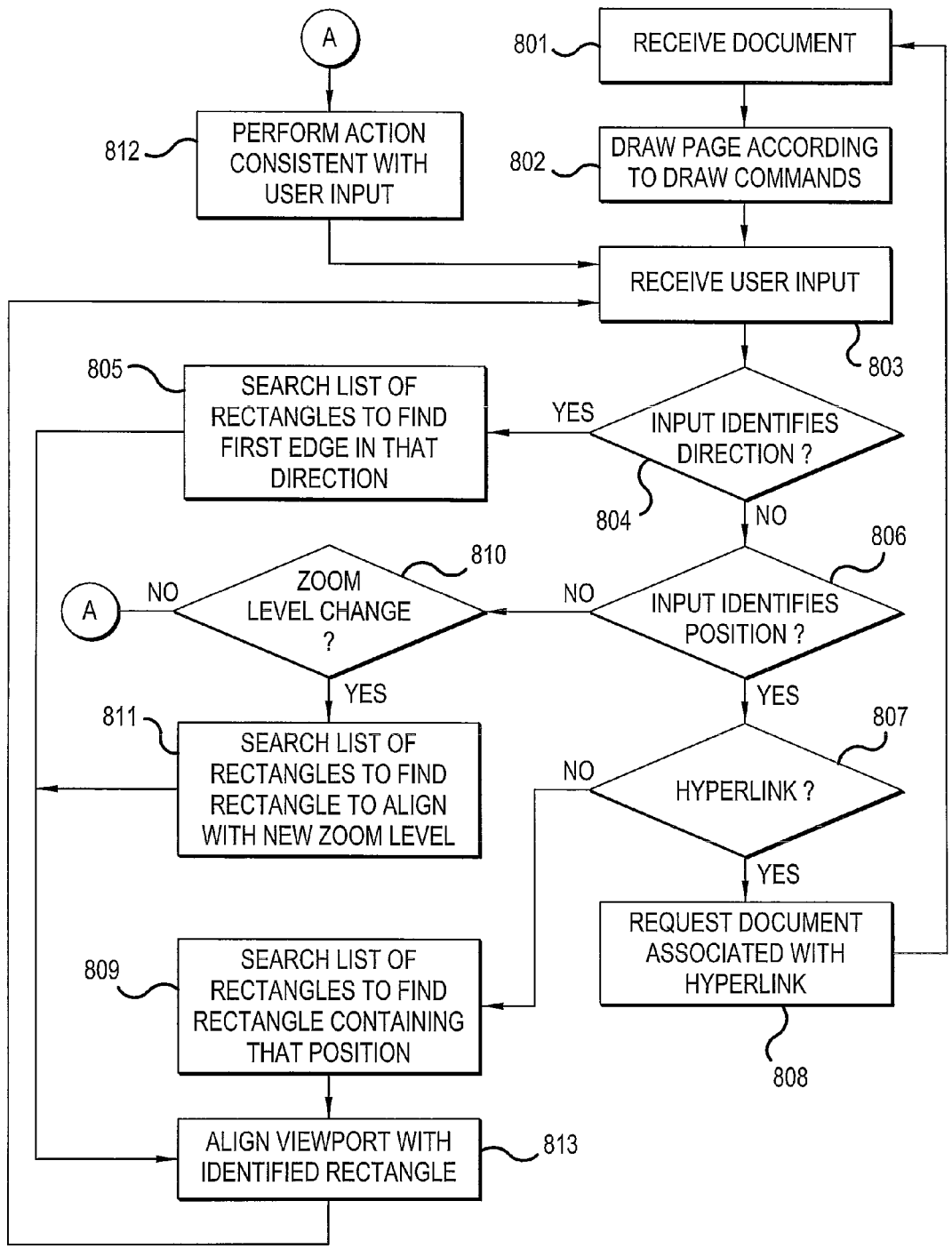
FIG. 8 is a flow chart illustrating a method of displaying a document coded or transcoded in accordance with the invention.

FIG. 8 is a flow chart which summarizes one exemplary embodiment of how a method consistent with the invention may be implemented as part of a user agent installed on a device 100. For purposes of convenience, this method is described as being implemented using the user agent 700 illustrated in FIG. 7. However, such method may also be implemented by a general browser type user agent 200 described above in connection with FIG. 2, modified as necessary to perform such a method.

In a first step 801, the user agent 700 receives a document 300. The document 300 may be received as a response to a previously issued request from the user agent 700, e.g., because the user has clicked on a hyperlink, entered a URI in the address input field 702, or made a selection from a list of favorites (a bookmark). In a next step 802, the user agent 700 draws the page 300, or at least a portion of the page 300 that fits within the viewport of the user interface 701 in accordance with the drawing commands received from the transcoding server 500.

The user agent 700 then waits for user input, which may be received in a step 803. According to this particular example, the user agent 700 determines in a next step 804 whether the user input defines a direction in which the user wants to scroll. If this is the case, in step 805 the list of rectangles received from the transcoding server 500 is searched until the first rectangle in the direction of the scrolling input is identified. The viewport is then, in step 813, aligned with the rectangle identified in the search. The method may then return to step 803 and wait for additional user input.

If the input does not identify a direction, the user agent 700 determines whether the input identifies a position in the document 300 in step 806. If it is determined that the input does identify a position, it is determined in step 807 if the position is associated with a hyperlink. If this is the case, the process moves on to step 808 where a request for the document 300 associated with that hyperlink is transmitted to the transcoding server 500, and the process returns to step 801.

If the input represents a position that is not associated with a hyperlink, the process moves on to step 809 where a search is performed in order to identify a rectangle containing the identified position. As described above, various rules may be implemented in order to determine which rectangle to choose if the position is inside several overlapping or nested rectangles.

After the appropriate rectangle has been selected, the viewport is aligned with the identified rectangle in step 813. Again, as discussed above, various rules for aligning the rectangle and the viewport may be implemented. Following step 813, the method may return to step 803 and wait for additional user input.

If in step 806 it is determined that the input does not identify a position (and, also, not a direction as previously determined in step 804) it is determined in step 810 whether the input represents a request to change a zoom level. If this is the case, the list of rectangles is searched in step 811 in order to identify a rectangle to align with the viewport after the change of zoom level has been performed. It should be understood that in some embodiments, a request to change zoom level may include a position in which to zoom in (or zoom out of), as would be identified in step 806.

Based on the determination made in step 811, the zooming operation is performed, e.g., by changing the resolution of the rendered portion of the document 300, and the viewport is aligned with the rectangle identified in step 813 in accordance with the appropriate rules, as discussed above. The method may then return to step 803 and wait for additional user input.

If it is determined in step 810 that the request is not a zoom level change request, some other part of the user agent functionality takes over and performs whatever action the user has requested in step 812, such as writing text into a input field, bringing up a menu, changing the orientation of the screen, etc. The process may then return to step 803 and wait for additional input.

It must be understood that the discussion with reference to FIG. 8 is an example, and that the invention may be implemented with other tests or a different sequence of steps to determine the nature of the user input.

According to an exemplary embodiment of the present invention, the selection of an edge or a corner of a rectangle that should be aligned with an edge or a corner of a viewport does not result in the immediate redrawing of the resulting portion of the document 300 to be displayed. This would result in discontinuous jump from one part of a document 300 to another, which may be confusing to a user. Instead, a scrolling movement may be made from the portion that is displayed when the user input is received to the selected new portion to be displayed, by calculating intermediate portions along a path between start and finish. This will give a user clear indication of how he or she is navigating through the document 300 and will make it easier to return to other portions of the document 300.

It is also consistent with principles of the invention to combine selections of a rectangle with a change in zoom level. In this case, if a user selects to zoom in or zoom out, a rectangle may be selected based on its closeness to the edge of the viewport after the zoom operation, and the position of the viewport may be adjusted to align with the selected rectangle in the same manner as described above with respect to scrolling or clicking. Also, zoom operations may involve intermediate zoom levels similar to the intermediate scroll positions in order to help give a user information about how he or she is navigating around the document 300.

Zoom operations may also be initiated by user input that also identifies a position in the document 300. If this position is inside a listed rectangle, this rectangle may be selected as the rectangle to be aligned with the viewport after the change in zoom level.

The user agent 700 may also be configured to perform certain actions simply because the pointer hovers over an element. One example that is consistent with the principles of the invention is to represent a rectangle with a border or with a different background color, or in some other way that sets the rectangle off from the rest of the page, if the pointing device is positioned inside the rectangle and the rectangle is associated with a hyperlink.

Without a pointer type input device, selection of rectangles may be more complicated, but a number of alternatives can be implemented according to the invention, such as keyboard or joystick input that moves from rectangle to rectangle.

In some embodiments, elements may be defined as spanning several rectangles, or in other words, several rectangles may be associated such that if one is selected, all are selected. The result is treated as an area that has a different shape than a rectangle, but rules for aligning the rectangles with the viewport may be implemented in the same manner. Such combinations of rectangles may primarily be useful in order to indicate that a hyperlink spans several lines of text that do not have an even right margin, or that several elements (e.g., an image and a text link) reference the same URI.

The various examples and embodiments discussed are exemplary only, and should not be construed as limiting on the scope of the present invention, which is defined in the appended claims.

What is claimed is:

1. A method for document transcoding performed by a transcoding computer configured to operate as a proxy server for a remote electronic device, said remote electronic device being configured to render markup language documents for an end user, comprising:
   receiving at said transcoding computer, a document request from said remote electronic device;
   requesting and receiving at said transcoding computer, a markup language document corresponding to the received document request, said document including a structured list of elements;
   utilizing a processor in the transcoding computer to:
      generate, based on the structure of said document,
         a virtual rendering representative of a layout of the document, said virtual rendering comprising drawing commands, which are executable by a user agent installed in said remote electronic device to draw a representation of the layout of said document on a display screen of said remote electronic device without parsing the markup language in said document, and
         a first list of element blocks and their positions in said layout, each of said positions being represented as coordinates of two diagonally opposing corners of the corresponding element block relative to a reference point of said layout; and
      generate transcoding data representative of said markup language document, including said drawing commands and said first list of said element blocks and their positions in said layout; and
   transmitting from the computer, said transcoding data representative of said markup language document, including said drawing commands and said first list of element blocks and their positions, to said remote electronic device whose user agent is programmed to process said transcoding data representative of said markup language document and execute at least a subset of said drawing commands in order to render at least a portion of said markup language document to said display screen of said remote electronic device in accordance with said layout by interpreting said transcoding data without parsing the markup language in the document.

2. The method of claim 1, wherein said step of receiving comprises sending an HTTP or an HTTPS request and receiving an HTTP or an HTTPS response.

3. The method of claim 1, wherein said processor generates the virtual rendering representative of the layout of the document by generating instructions interpretable by a display manager or controller to draw a representation of said layout on a display.

4. The method of claim 3, wherein said transcoding data representative of said markup language document, which is transmitted to said remote electronic device, includes at least a subset of said instructions to be executed by said electronic device.

5. The method of claim 1, wherein said element blocks are text blocks.

6. The method of claim 1, wherein said blocks are rectangles and said positions are defined by at least two pairs of coordinates.

7. The method of claim 1, wherein said received markup language document includes one or more references to other documents, the processor further being utilized to:
   identify, from said virtual rendering, one or more reference blocks, each reference block containing a reference to another document; and
   include with said transcoding data a second list of said identified reference blocks and their positions in said layout.

8. The method of claim 7, wherein said references are hyperlinks.

9. The method of claim 1, wherein said markup language is HTML, XHTML or XML.

10. A server configured to operate as a proxy server for a remote electronic device, said remote electronic device being configured to render markup language documents for an end user, said server configured to receive a document request from said remote electronic device, request and receive a markup language document which corresponds to the received document request and includes a structured list of elements, and transcode the document, the server comprising:
    a processor programmed to:
       generate, based on the structure of said document,
          a virtual rendering representative of a layout of the document, said virtual rendering comprising drawing commands, which are executable by a user agent installed in said remote electronic device to draw a representation of the layout of said document on a display screen of said remote electronic device without parsing the markup language in said document, and
          a first list of element blocks and their positions in said layout, each of said positions being represented as coordinates of two diagonally opposing corners of the corresponding element block relative to a reference point of said layout; and
       generate transcoding data representative of said markup language document, including said drawing commands and said first list of said element blocks and their positions in said layout; and
       cause the server to transmit said transcoding data representative of said markup language document, including said drawing commands and said first list of element blocks and their positions, to said remote electronic device whose user agent is programmed to process said data representative of said markup language document and execute at least a subset of said drawing commands in order to render at least a portion of said markup language document to said display screen of said remote electronic device in accordance with said layout by interpreting said transcoding data without parsing the markup language in the document.

11. The server of claim 10, wherein said server is configured to receive the markup language document by sending an HTTP or an HTTPS request and receiving an HTTP or an HTTPS response.

12. The server of claim 10, wherein said processor generates the virtual rendering representative of the layout of the document by generating instructions interpretable by a display manager or controller to draw a representation of said layout on a display.

13. The server of claim 12, wherein said transcoding data representative of said markup language document, which is transmitted to said remote electronic device, includes at least a subset of said instructions to be executed by said electronic device.

14. The server of claim 10, wherein said element blocks are text blocks.

15. The server of claim 10, wherein said element blocks are rectangles.

16. The server of claim 10, wherein said received markup language document includes one or more references to other documents, the processor further being programmed to:
   identify, from said virtual rendering, one or more reference blocks, each reference block containing a reference to another document; and
   include with said transcoding data a second list of said identified reference blocks and their positions in said layout.

17. The server of claim 16, wherein said references are hyperlinks.

18. The server of claim 10, wherein said markup language is HTML, XHTML or XML.

19. A non-transitory computer readable medium on which is embodied a computer program to be executed by a transcoding computer that is configured to operate as a proxy server for a remote electronic device, said remote electronic device being configured to render markup language documents for an end user, said computer program comprising instructions which, when executed, cause the transcoding computer to perform the following:
   receive a document request from said remote electronic device;
   request and receive a markup language document corresponding to the received document request, said document including a structured list of elements;
   generate, based on the structure of said document,
      a virtual rendering representative of a layout of the document, said virtual rendering comprising drawing commands, which are executable by a user agent installed in said remote electronic device to draw a representation of the layout of said document on a display screen of said remote electronic device without parsing the markup language in said document, and
      a first list of element blocks and their positions in said layout, each of said positions being represented as coordinates of two diagonally opposing corners of the corresponding element block relative to a reference point of said layout;
   generate transcoding data representative of said markup language document, including said drawing commands and said first list of said element blocks and their positions in said layout; and
   transmit said transcoding data representative of said markup language document, including said drawing commands and said first list of element blocks and their positions, to said remote electronic device whose user agent is programmed to process said data representative of said markup language document and execute at least a subset of said drawing commands in order to render at least a portion of said markup language document to said display screen of said remote electronic device in accordance with said layout by interpreting said transcoding data without parsing the markup language in the document.

20. The computer readable medium of claim 19, wherein said instructions cause the computer to receive the markup language document by sending an HTTP or an HTTPS request and receiving an HTTP or an HTTPS response.

21. The computer readable medium of claim 19, wherein said instructions cause the computer to generate the virtual rendering representative of the layout of the document by generating instructions interpretable by a display manager or controller to draw a representation of said layout on said display.

22. The computer readable medium of claim 21, wherein said transcoding data representative of said markup language document, which is transmitted to said remote electronic device, includes at least a subset of said instructions to be executed by said electronic device.

23. The computer readable medium of claim 19, wherein said element blocks are text blocks.

24. The computer readable medium of claim 19, wherein said element blocks are rectangles.

25. The computer readable medium of claim 19, wherein said received markup language document includes one or more references to other documents, the instructions further causing the computer to:
   identify, from said virtual rendering, one or more reference blocks, each reference block containing a reference to another document; and
   include with said transcoding data a second list of said identified reference blocks and their positions in said layout.

26. The computer readable medium of claim 25, wherein said references are hyperlinks.

27. The computer readable medium of claim 19, wherein said markup language is HTML, XHTML or XML.

* * * * *